INVENTOR.
HERBERT C. RHODES
BY
ATTORNEY

INVENTOR.
HERBERT C. RHODES
BY
ATTORNEY

Oct. 23, 1956 H. C. RHODES 2,767,666
APPARATUS FOR ORIENTING DOUGH PIECES
Filed Jan. 3, 1955 3 Sheets-Sheet 3

INVENTOR.
HERBERT C. RHODES
BY
*F. R. Geisler*
ATTORNEY

United States Patent Office 2,767,666
Patented Oct. 23, 1956

2,767,666

APPARATUS FOR ORIENTING DOUGH PIECES

Herbert C. Rhodes, Portland, Oreg.

Application January 3, 1955, Serial No. 479,323

6 Claims. (Cl. 107—12)

The present invention relates to the orienting of the flattened individual pieces of dough, as they are passed through the rolls of a dough molding machine, preparatory to being shaped or rolled up into proper condition for deposit into the baking pans.

This invention is concerned more specifically with the positioning or turning of the flattened dough pieces, as they are received from the initial rolls of the molding machine, in order that the successive individual dough pieces may be given a particular desired treatment.

One object of the invention is to provide improved means for turning each dough piece 90° as it is moved along in its course from the initial molding rolls, the purpose of the turning of the piece through 90° being to enable the dough to receive what is familiarly known as "cross grain" molding. In this regard the present application is a continuation-in-part of my previous application, Serial No. 311,615, filed under date of September 26, 1952, and entitled "Cross Grain Dough Molding Means," now U. S. Patent No. 2,728,307, dated December 27, 1955.

In the above mentioned patent, part of the means used for causing each dough piece to be turned the desired 90° includes a stationary finger with which one side of the dough piece comes into engagement and which temporarily restrains that portion of the dough piece against further movement until the dough piece has been turned so as to enable it to slide past the stationary finger. However, if a soft piece of flattened dough is moving quite rapidly, the sudden engagement of a portion of such dough piece with such a stationary engaging element in this manner has a tendency to compact that portion of the dough piece and to increase its thickness in comparison with the substantially uniform thickness of the remainder of the piece. Consequently, a related object of the present invention is to provide improved means for engaging a portion of the dough piece and temporarily restraining the dough piece so as to cause the dough piece to turn, which restraining means, however, will not have any appreciable effect on the thickness of the engaged portion of the dough piece regardless of the speed at which the dough piece is moving when such restraining engagement takes place.

While the turning of a dough piece 90° during its course through the sets of molding rolls enables "cross grain" molding to be obtained, the turning of the dough piece the entire amount of 180° instead of 90° results in what is familiarly known as "reverse sheeting." If the action of the rolls of the dough molding machine takes place only in one direction there is a tendency for the air bubbles or pockets in the dough to be moved towards the tail end of the dough piece as it is engaged by the rolls of the machine, and, particularly with some grades of dough, it is desirable to avoid this resulting accummulation of air bubbles or pockets at or near one end of the dough piece. By turning the dough piece 180° during the travel of the dough piece through the molding machine, and thus causing the dough piece to be reversed when engaging some of the molding rolls, the tendency of the air bubbles or pockets to be pressed towards one end only is counteracted.

A further object of the present invention is to provide an improved device in which the dough pieces can be turned the entire 180° as well as 90° and which, with slight adjustment, can thus be made to provide either for "cross grain" molding or "reverse sheeting," whichever is desired.

These objects and further advantages I am able to attain in a simple and practical manner with the employment of my improved dough treating means, constructed and arranged as hereinafter briefly described.

In the following description, reference is made to the accompanying drawings, wherein.

Figure 1:
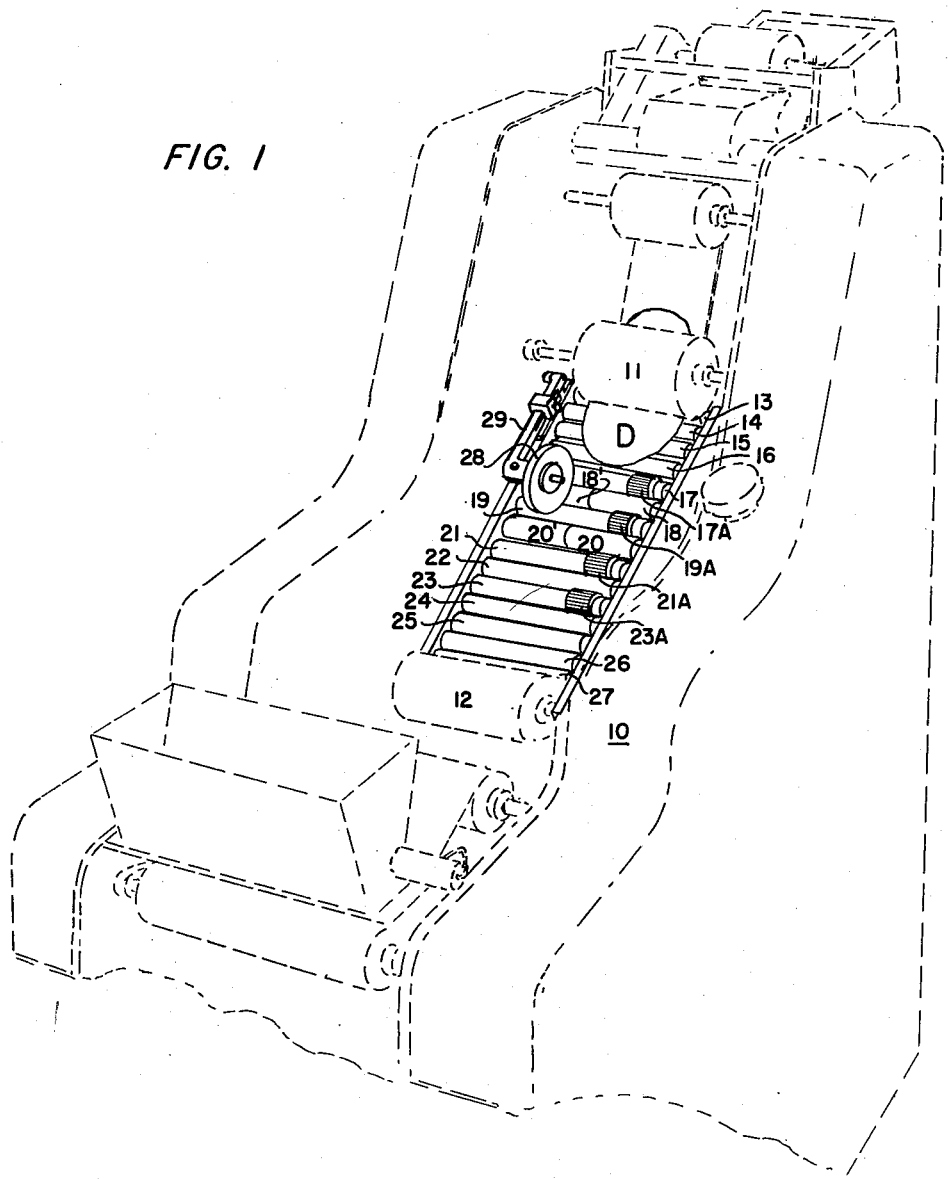
Figure 1 is a perspective view of my dough treating means shown in position in a dough molding machine, the latter being indicated by broken lines.

Referring first to Figure 1, my dough treating means is positioned in the upper or intake end section of a dough molding machine of well known design, the dough molding machine being shown in part by broken lines and being indicated in general by the reference character 10. The dough molding machine, as is customary, includes several pairs of dough molding rolls. The dough pieces pass between the rolls of each pair in their travel, the successive pairs of rolls in the portion of the dough molding machine illustrated being located at lower levels. My special dough treating means is positioned between an upper pair of molding rolls indicated at 11 in Figure 1 and a lower pair of molding rolls indicated at 12, only the upper roll of each pair being shown in broken lines in Figure 1.

Figure 2:
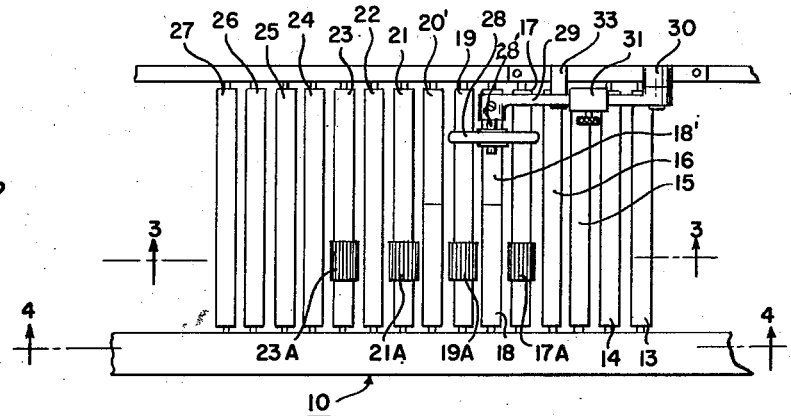
Figure 2 is a top plan view of the dough treating means and adjacent side frame portions of the dough molding machine in which my dough treating means is mounted.

My device includes a downwardly sloping dough conveyor composed of a number of rotatable rollers of the same diameter which are mounted in close succession on parallel axes. Some of the rollers are rotated in unison, the others being idler rollers. In my preferred construction alternate rollers are driven rollers and the others are idler rollers. Thus, in Figures 1 and 2 the driven rollers of the conveyor are indicated at 13, 15, 17, 19, 21, 23, 25 and 27, while the intervening rollers 14, 16, 18, 20, 24, and 26 are the idlers. The driven rollers are driven in unison in counterclockwise direction, (as viewed from the right in Figure 1) by adjustable means later described. Both the driven rollers and the idlers are surfaced in the same manner as is now customary with dough molding rolls, that is with some material to prevent the sticking of the dough to the rolls or rollers.

Thus the flattened dough pieces, after leaving the pair of dough molding rolls 11, would, under ordinary conditions, pass freely down along the conveyor formed by the rollers 13 to 27, inclusive, and such movement of the dough pieces would be caused partly by gravity but mainly by the impetus received from the driven rollers of the conveyor.

Figure 3:
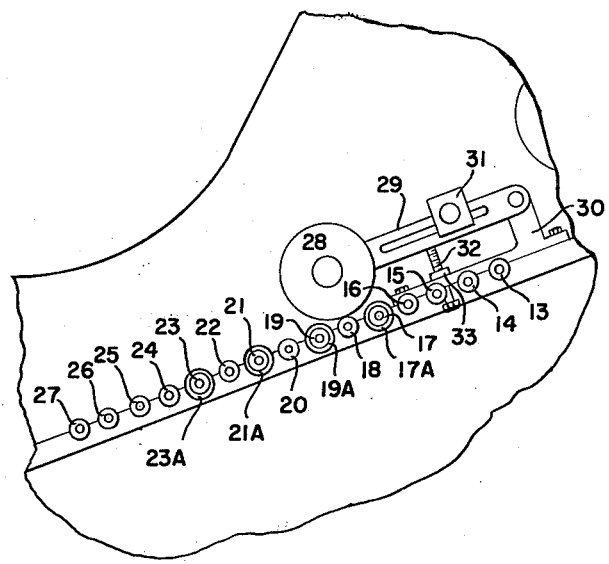
Figure 3 is a fragmentary sectional elevation taken on line 3—3 of Figure 2.

A dough-engaging wheel 28 (Figures 1, 2 and 3) is rotatably mounted on a stub shaft 28' adjustably carried on an arm 29, which arm in turn is pivotally mounted on a bracket 30 secured to the dough molding machine frame at the side of the conveyor. The arm 29 is mounted so as to swing up and down, the main portion of the arm being parallel to the side of the dough molding machine. The free end of the arm 29 has a right angle bend so that the stub shaft on which the wheel 28 rotates will be horizontal and parallel to the rollers of the conveyor. The arm 29 and stub shaft 28' are so positioned that the wheel 28 will rest on an idler roller when it is not raised above the conveyor. The stub shaft 28' for the wheel is adjustably secured in the end of the arm by a set screw. Thus, the stub shaft for the wheel and the axis of the particular idler roller on which the wheel rests when in lowermost position extend in the same plane, which plan in such case would be perpendicular to the general plane of the conveyor, as indicated in Figure 3, and the wheel 28 can be moved up and down above the conveyor and its position adjusted slightly transversely with respect to the conveyor.

A weight 31 is adjustably positioned on the arm 29. An adjustable stop, consisting of a screw threaded member 32 (Figure 3) extends upwardly through a stationary support 33. The stationary support 33 projects inwardly from the bracket 30 and is an integral part of the bracket 30. Thus the adjustable stop 32 is so arranged as to be capable of engagement with the underside of the arm 29 and can be caused to hold the arm 29, and therewith the wheel 28, in raised position above the track.

Some of the driven rollers, thus the rollers 17, 19, 21 and 23 in the device as shown, are provided with sleeves 17A, 19A, 21A and 23A, respectively, which are fluted on their outer surface. These sleeves are axially adjustable on their rollers but are prevented from rotating independently of their rollers either due to being fitted tightly thereon or to being keyed thereon. The outer surfaces of these sleeves are fluted, or otherwise roughened, in order that they may exert a better grip on the dough pieces which they engage, the reason for which will be apparent presently.

Some of the idler rollers, thus the idler rollers 18 and 20 in the device illustrated, are divided at the center so as to form two independent identical idler rollers 18 and 18' and 20 and 20' on the same axis. The abutting ends of these companion portions of the divided rollers are spaced apart by thin anti-friction washers. Thus, the dough engaging wheel 28 is located on one side of the center line of the conveyor, the dough engaging sleeves 17A, 19A, 21A and 23A are located on the opposite side of the center line, and some of the idler rollers, particularly the idler roller beneath the wheel 28, are divided in half at the center with the two halves of the idler rollers independently rotatable.

Figure 4:
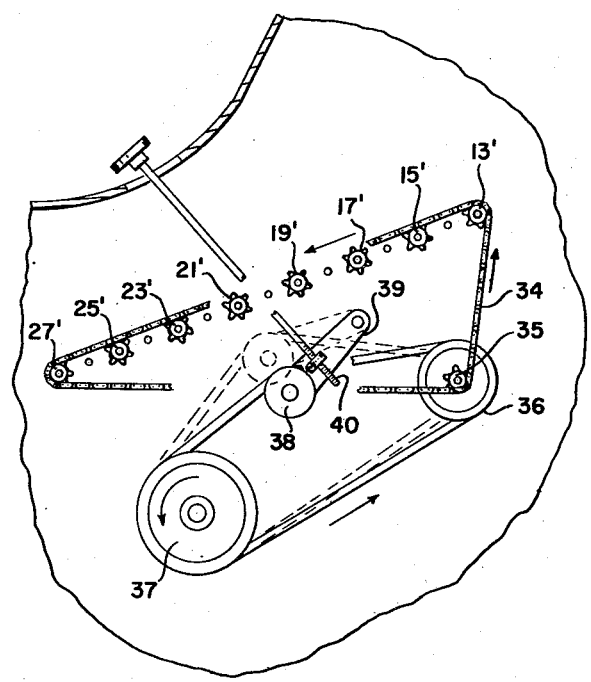
Figure 4 is a fragmentary, more or less diagrammatic, sectional elevation taken on line 4—4 of Figure 2 and illustrating the driving mechanism and speed regulating means for the dough treating means.

The driven rollers 13, 15, 17, 19, 21, 23, 25 and 27 have identical sprockets 13', 15', 17', 19', 21', 23', 25' and 27' (see Figure 4) which sprockets are engaged by an endless driven sprocket chain 34. The sprocket chain passes around a drive sprocket 35. A variable speed pulley 36 is carried on the shaft of the drive sprocket 35 and the variable speed pulley 36 is adjustably driven by a V-belt connection with a pulley 37, the pulley 37 being motor driven through suitable means (not shown). Thus, the drive sprocket 35 and therewith the sprocket chain 34 can be driven at variable speeds. An idler, belt-tensioning, pulley 38 is carried on an arm 39 and this arm 39 is adjusted by an adjusting screw 40 so as to enable the tension of the V-belt which engages the variable speed pulley 36 to be adjusted. The varying of the tension of the V-belt enables the speed of the driven pulley 36 to be varied in the well known manner and in this way the speed imparted to the sprocket 35, and therewith the speed of the driven rollers of the conveyor, can be adjusted by means of the adjusting screw 40.

Figure 5:
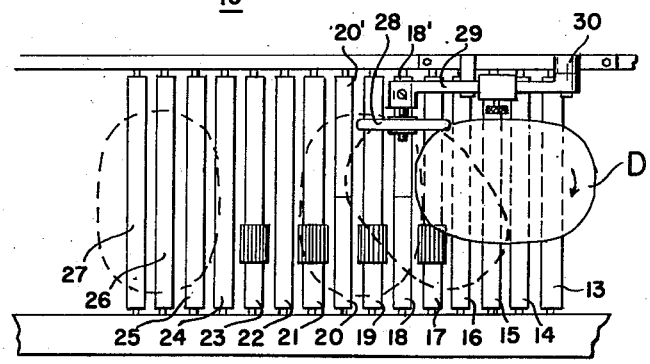
Figure 5 is a plan view, similar to Figure 2, but illustrating the operation of the device in the turning of the dough pieces 90°.

The operation of my dough treating means will now be described when it is employed for the purpose of obtaining "cross grain" molding. Referring to Figures 1 and 5, let it be assumed that a piece of dough D is delivered onto the conveyor from the pair of molding rolls 11. Such dough piece will generally be more or less oval in shape and the thickness of the flattened molded dough piece will depend partly on the consistency of the dough and mainly on the adjusted squeezing pressure exerted on the dough by the dough molding rolls, as is well understood.

When the flattened piece of dough D leaves the pair of dough molding rolls 11 and moves downwardly along the conveyor, one side of the dough piece contacts the wheel 28 and starts to pass under the wheel, and thus between the wheel and the half portion 18' of the idler roller beneath the wheel. The inertia of the wheel 28 temporarily restrains the passing of the dough piece under the wheel and thus retards the movement of the dough at that point. At the same time, however, the driven rollers, and in particular the sleeves 17A and 19A of the driven rollers, engage the bottom face of the dough piece on the opposite side of the conveyor and consequently cause the dough piece to turn, in clockwise direction as viewed in Figure 5, and as indicated by the subsequent broken line portions of the dough piece as shown in that figure. Depending upon the speed at which the dough piece moves, and also depending upon the amount of restraint exerted by the wheel 28, the dough piece can be caused to rotate the desired 90° before it moves out from under the wheel 28 and continues freely on its course. The turned and freed dough piece then travels the remainder of the distance down the conveyor until it reaches the lower pair of molding rolls where it begins to receive the desired "cross grain" molding.

An important feature of my device is the fact that the restrained side of the dough piece passes under the wheel 28. Such contact of the dough piece with the wheel consequently does not result in any congesting or thickening of the dough piece at that point, as would occur, for example, if a stationary dough-engaging pin were substituted for the wheel 28.

The movable weight 31 on the arm 29 enables the downward pressure of the wheel 28 on the engaged dough piece to be adjusted so that enough pressure will be exerted for temporarily retarding the movement on that side of the dough piece but without requiring any excessive pressure to be exerted on the dough at such point. For extra thick pieces of dough the initial position of the retarding wheel 28 can be so set as to be slightly spaced above the idler half roller 18' by means of the adjusting stop 32 (Figure 3), and of course, if no "cross grain" molding or no turning of the dough piece whatsoever is desired, the wheel 28 can be rendered entirely inactive by raising it sufficiently above the conveyor so that there would be no contact with the dough.

While my device will operate in the manner described even if the sleeves 17A, 19A, 21A and 23A are omitted from the driven rollers, the addition of these dough-engaging sleeves to the rollers makes the action more positive. Also my device will operate without having split idler rollers such as 18, 18' and 20, 20', but again I consider the construction which I have illustrated to be preferable inasmuch as the splitting of these idler rollers, as will be evident, assists in enabling one side of the dough piece to halt temporarily while the other side continues its downward movement.

Figure 6:
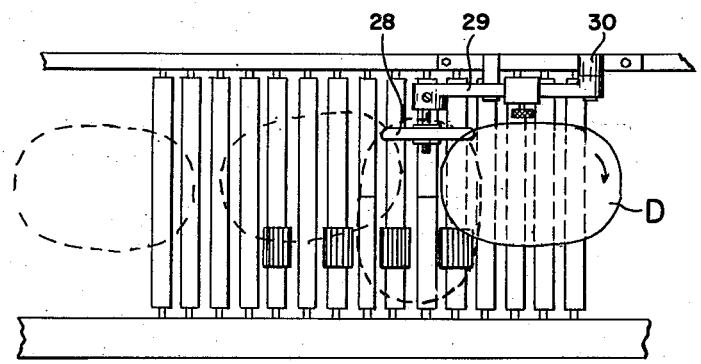
Figure 6 is a similar plan view illustrating the turning of the dough pieces 180° as a result of the operation of the device at greater speed.

As previously indicated, in order to achieve the desired 90° turn of the dough pieces for "cross grain" molding in my device, the dough pieces must move down the conveyor at proper speed. I have found that, under such conditions if the speed of the travel of the dough piece is increased there will be a greater degree of turning imparted to the dough pieces. In fact, by moderately increasing the speed of rotation of the driven rollers in the conveyor of my device, I am able to turn the dough pieces through 180° instead of 90°. The operation of my device in this manner is illustrated in Figure 6. The change of speed of the driven rollers is readily obtained through the simple, well-known speed control means indicated in Figure 4, or it could be obtained by any other suitable speed adjusting mechanism. The turning of the dough pieces 180° enables "reverse sheeting" to be obtained just as readily as "cross grain" molding. The reasons why "reverse sheeting" is sometimes desirable have previously been explained.

Thus my device can be used selectively either for "cross grain" molding or "reverse sheeting"; any turning of the dough pieces can be eliminated when not desired merely by raising the dough retarding wheel out of contact with the dough; and the retarding engagement of the wheel 28 with the dough pieces can be adjusted for different types and thicknesses of dough so that no thickening or mutilation of the dough pieces will occur as a result of their contact with the dough retarding means.

I claim:

1. In a dough treating device of the character described, a downwardly sloping conveyor formed by a succession of adjacent rotatable rollers of the same diameter arranged with their axes parallel, the alternate rollers in said conveyor being driven rollers, the other rollers being idler rollers, means for driving said driven rollers in unison, a dough-engageable wheel positioned above said conveyor on one side of the longitudinal center line of said conveyor, the axis of said wheel being parallel to said rollers, a mounting support for said wheel arranged for up and down movement, said wheel resting on one of said idler rollers when said wheel is in its lowest position, said wheel, when in dough-engaging position, adapted to press downwardly on the piece of dough passing underneath said wheel and to restrain momentarily the movement of the engaged portion of such dough piece on said conveyor, whereby pieces of dough moving along said conveyor when engaged by said wheel will receive partial rotational rotational turn before passing from said wheel.

2. In a dough treating device of the character described, a conveyor formed by a succession of adjacent rotatable rollers of substantially the same diameter arranged with their axes parallel, some of said rollers in said conveyor being driven rollers, the other rollers being idler rollers, means for driving said driven rollers in unison, means for varying the speed produced by said roller driving means, a dough-engageable wheel positioned above said conveyor on one side of the longitudinal center line, the axis of said wheel being parallel to said rollers, a mounting support for said wheel arranged for up and down movement, said wheel resting on one of said idler rollers when said wheel is in the lower position, said wheel, when in dough-engaging position, adapted to press downwardly on the piece of dough passing underneath said wheel and momentarily restrain the movement of the engaged portion of such dough piece on said conveyor, whereby pieces of dough moving along said conveyor when engaged by said wheel will receive a partial rotational turn before passing from said wheel.

3. In a dough treating device of the character described, a conveyor formed by a succession of adjacent rotatable rollers of substantially the same diameter arranged with their axes parallel, some of said rollers in said conveyor being driven rollers, the other rollers being idler rollers, means for driving said driven rollers in unison, a dough-engageable wheel positioned above one side of said conveyor, the axis of said wheel being parallel to said rollers, a mounting support for said wheel arranged for up and down movement, said wheel resting on one of said idler rollers when said wheel is in its lowest position, said wheel, when in dough-engaging position, adapted to press downwardly on the piece of dough passing underneath said wheel and momentarily restrain the movement of the engaged portion of such dough piece on said conveyor, means for adjusting the downward pressure of said wheel on engaged dough pieces, dough-engaging sleeves adjustably secured on some of said driven rollers on the opposite side of the longitudinal center line of said conveyor from said wheel, whereby pieces of dough moving along said conveyor when engaged by said wheel will receive a partial rotational turn before passing from said wheel.

4. In a dough treating device of the character described, a conveyor formed by a succession of adjacent rotatable rollers of the same diameter arranged with their axes parallel, some of said rollers in said conveyor being driven rollers, the other rollers being idler rollers, means for driving said driven rollers in unison, means for varying the speed produced by said roller driving means, a dough-engageable wheel positioned above said conveyor on one side of the longitudinal center line, the axis of said wheel being parallel to said rollers, a mounting arm for said wheel hinged for up and down movement, said wheel resting on one of said idler rollers when said wheel is in its lowest position, said wheel, when in dough-engaging position, adapted to press downwardly on the piece of dough passing underneath said wheel and momentarily restrain the movement of the engaged portion of such dough piece on said conveyor, means for adjusting the downward pressure of said wheel on engaged dough pieces, an adjustable stop limiting the downward movement of said wheel whereby to hold said wheel normally spaced a predetermined distance above said conveyor, whereby pieces of dough moving along said conveyor when engaged by said wheel will receive a partial rotational turn before passing from said wheel.

5. In a dough treating device of the character described, a downwardly sloping conveyor formed by a succession of adjacent rotatable rollers of the same diameter arranged with their axes parallel, the alternate rollers in said conveyor being driven rollers, the other rollers being idler rollers, means for driving said driven rollers in unison, one of said idler rollers being divided at the center with each half independently rotatable, a dough-engageable wheel positioned above said conveyor on one side of the longitudinal center line, the axis of said wheel being parallel to said rollers, a mounting arm for said wheel hinged for up and down movement, said wheel resting on one of said halves of said divided idler roller when said wheel is in its lowest position, said wheel, when in dough-engaging position, adapted to press downwardly on the piece of dough passing underneath said wheel and momentarily restrain the movement of the engaged portion of such dough piece on said conveyor, an adjustable weight on said mounting arm for adjusting the downward pressure of said wheel on engaged dough pieces, dough-engaging sleeves adjustable secured on some of said driven rollers on the opposite side of the longitudinal center line of said conveyor from said wheel, whereby pieces of dough moving along said conveyor when engaged by said wheel will receive a partial rotational turn before passing from said wheel.

6. In a dough treating device of the character described, a downwardly sloping conveyor formed by a succession of adjacent rotatable rollers of the same diameter arranged with their axes parallel, the alternate rollers in said conveyor being driven rollers, the other rollers being idler rollers, means for driving said driven rollers in unison, means for varying the speed produced by said roller driving means, some of said idler rollers being divided at the center with each half independently rotatable, a dough-engageable wheel positioned above said conveyor on one side of the longitudinal center line, the axis of said wheel being parallel to said rollers, a mounting arm for said wheel hinged for up and down movement, said wheel resting on one of said halves of a divided idler roller when said wheel is in its lowest position, said wheel, when in dough-engaging position, adapted to press downwardly on the piece of dough passing underneath said wheel and momentarily restrain the movement of the engaged portion of such dough piece on said conveyor, an adjustable weight on said mounting arm for adjusting the downward pressure of said wheel on engaged dough pieces, an adjustable stop limiting the downward movement of said wheel whereby to hold said wheel normally spaced a predetermined distance above said conveyor, means for adjusting the position of said wheel transversely with respect to said conveyor, whereby pieces of dough moving along said conveyor when engaged by said wheel will receive a partial rotational turn before passing from said wheel, and whereby the extend of such rotational turn can be controlled in part by adjusting the speed of said roller driving means.

References Cited in the file of this patent

UNITED STATES PATENTS

| | | |
|---|---|---|
| 821,860 | Colborne et al. | May 29, 1906 |
| 1,763,620 | Wolfarth et al. | June 10, 1930 |
| 1,871,753 | Smith | Aug. 16, 1932 |